(12) United States Patent
Rassam et al.

(10) Patent No.: US 11,638,169 B2
(45) Date of Patent: Apr. 25, 2023

(54) FIRST RADIO ACCESS TECHNOLOGY (RAT) CHANNEL STATE FEEDBACK (CSF) TO INCREASE ACCURACY OF INTERFERENCE ESTIMATES FROM SECOND RAT NEIGHBOR CELLS WITH DYNAMIC SPECTRUM SHARING (DSS)

(71) Applicant: QUALCOMM Incorporated, San Diego, CA (US)

(72) Inventors: Faris Rassam, El Cajon, CA (US); Hobin Kim, San Diego, CA (US); Alexei Yurievitch Gorokhov, San Diego, CA (US); Hari Sankar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 17/394,221

(22) Filed: Aug. 4, 2021

(65) Prior Publication Data

US 2022/0053512 A1 Feb. 17, 2022

Related U.S. Application Data

(60) Provisional application No. 63/065,370, filed on Aug. 13, 2020.

(51) Int. Cl.
*H04B 17/318* (2015.01)
*H04B 17/336* (2015.01)
(Continued)

(52) U.S. Cl.
CPC .......... *H04W 24/10* (2013.01); *H04B 17/318* (2015.01); *H04B 17/336* (2015.01);
(Continued)

(58) Field of Classification Search
CPC ... H04B 7/02–12; H04B 17/0082–3913; H04J 11/0023–0093;
(Continued)

(56) References Cited

U.S. PATENT DOCUMENTS

| 2016/0227426 A1* | 8/2016 | Hwang | H04W 24/10 |
| 2019/0053084 A1* | 2/2019 | Hosseini | H04W 24/10 |
| 2022/0086844 A1* | 3/2022 | Rassam | H04W 24/10 |

FOREIGN PATENT DOCUMENTS

| EP | 3021608 A1 | 5/2016 | |
| EP | 3169006 A1 * | 5/2017 | ............ H04W 24/10 |

(Continued)

OTHER PUBLICATIONS

3GPP TS 38.214: "3rd Generation Partnership Project; Technical Specification Group Radio Access Network; NR; Physical Layer Procedures for Data (Release 16)", 3GPP TS 38.214 V16.2.0, Jun. 2020, 3GPP Standard, Technical Specification, 3rd Generation Partnership Project (3GPP), pp. 1-163, XP051925549, Retrieved from the Internet: URL: http://ftp.3gpp.org/Specs/archive/38_series/38.214/38214-g20.zip 38214-g20.docx [retrieved on Jul. 20, 2020].

(Continued)

*Primary Examiner* — Timothy J Weidner
(74) *Attorney, Agent, or Firm* — Seyfarth Shaw LLP

(57) ABSTRACT

A user equipment (UE) receives, from a base station, a message including at least one reporting configuration and resource configuration for a number of channel state information-interference measurement (CSI-IM) resource patterns associated with a first radio access technology (RAT). Each of the configured CSI-IM resource patterns corresponds to a time and frequency location in a resource block of a neighbor cell associated with a second RAT. The UE transmits one or more CSI reports based on the reporting configuration(s) and the resource configuration(s).

30 Claims, 11 Drawing Sheets

(51) Int. Cl.
- *H04J 11/00* (2006.01)
- *H04W 8/24* (2009.01)
- *H04W 16/14* (2009.01)
- *H04W 24/08* (2009.01)
- *H04W 24/10* (2009.01)
- *H04W 72/12* (2009.01)
- *H04W 84/02* (2009.01)
- *H04W 88/02* (2009.01)
- *H04W 88/08* (2009.01)
- *H04W 92/02* (2009.01)
- *H04W 92/10* (2009.01)
- *H04W 72/1263* (2023.01)

(52) U.S. Cl.
CPC ....... *H04J 11/0026* (2013.01); *H04J 11/0056* (2013.01); *H04W 8/245* (2013.01); *H04W 16/14* (2013.01); *H04W 24/08* (2013.01); *H04W 72/1226* (2013.01); *H04W 72/1263* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC .. H04J 2011/0003–0096; H04L 5/0001–0098; H04W 8/22–245; H04W 16/02–16; H04W 24/02–10; H04W 28/02–26; H04W 36/0005–385; H04W 48/02–20; H04W 56/001–003; H04W 72/005–14; H04W 74/002–008; H04W 84/02–16; H04W 88/02–12; H04W 92/02–04; H04W 92/10

See application file for complete search history.

(56) References Cited

FOREIGN PATENT DOCUMENTS

| EP | 3169006 A1 | 5/2017 | |
|---|---|---|---|
| EP | 3562230 A1 | 10/2019 | |
| WO | 2017173033 A1 | 10/2017 | |
| WO | WO-2017173033 A1 * | 10/2017 | ............ H04W 24/10 |

OTHER PUBLICATIONS

International Search Report and Written Opinion—PCT/US2021/044798—ISA/EPO—dated Nov. 19, 2021.

* cited by examiner

700 ⟶

702 — RECEIVE, FROM A BASE STATION, A MESSAGE INCLUDING AT LEAST ONE REPORTING CONFIGURATION AND RESOURCE CONFIGURATION FOR A NUMBER OF CHANNEL STATE INFORMATION-INTERFERENCE MEASUREMENT (CSI-IM) RESOURCE PATTERNS ASSOCIATED WITH A FIRST RADIO ACCESS TECHNOLOGY (RAT);

EACH CSI-IM RESOURCE PATTERN OF THE CSI-IM RESOURCE PATTERNS CORRESPONDS TO A TIME AND FREQUENCY LOCATION IN A RESOURCE BLOCK OF A NEIGHBOR CELL ASSOCIATED WITH A SECOND RAT

704 — TRANSMIT ONE OR MORE CSI REPORTS BASED ON THE REPORTING CONFIGURATION(S) AND THE RESOURCE CONFIGURATION(S).

FIRST RADIO ACCESS TECHNOLOGY (RAT) CHANNEL STATE FEEDBACK (CSF) TO INCREASE ACCURACY OF INTERFERENCE ESTIMATES FROM SECOND RAT NEIGHBOR CELLS WITH DYNAMIC SPECTRUM SHARING (DSS)

CROSS-REFERENCE TO RELATED APPLICATION

The present application claims the benefit of U.S. Provisional Patent Application No. 63/065,370, filed on Aug. 13, 2020, and titled "5G NEW RADIO (NR) CHANNEL STATE FEEDBACK (CSF) TO INCREASE ACCURACY OF INTERFERENCE ESTIMATES FROM LONG-TERM EVOLUTION (LTE) NEIGHBOR CELLS WITH DYNAMIC SPECTRUM SHARING (DSS)," the disclosure of which is expressly incorporated by reference in its entirety.

FIELD OF THE DISCLOSURE

Aspects of the present disclosure generally relate to wireless communications, and more particularly to techniques and apparatuses using first radio access technology (RAT) (e.g., 5G new radio (NR)) channel state feedback (CSF) to increase accuracy of interference estimates from second RAT (e.g., long term evolution (LTE)) neighbor cells with dynamic spectrum sharing (DSS).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

According to aspects of the present disclosure, a method of wireless communication by a user equipment (UE) receives, from a base station, a message comprising at least one reporting configuration and resource configuration for a number of channel state information-interference measurement (CSI-IM) resource patterns associated with a first radio access technology (RAT). Each of the of CSI-IM resource patterns corresponds to a time and frequency location in a resource block of a neighbor cell associated with a second RAT. The method also transmits one or more CSI reports based on the reporting configuration(s) and the resource configuration(s).

In other aspects of the present disclosure, a method of wireless communication by a base station associated with a first radio access technology (RAT) includes configuring one or more reporting configurations and resource configurations for a number of CSI-IM resource patterns associated with the first RAT. Each of the CSI-IM resource patterns corresponds to a time and frequency location in a resource block of a neighbor cell associated with a second RAT. The method also transmits, to a UE, a message indicating the reporting configuration(s) and the resource configuration(s). The method further receives, from the UE, one or more CSI reports based on the transmitted message.

In other aspects of the present disclosure, an apparatus for wireless communications at a UE includes a processor and memory coupled with the processor. Instructions stored in the memory are operable, when executed by the processor, to cause the apparatus to receive, from a base station, a message including at least one reporting configuration and resource configuration for a number of channel state information-interference measurement (CSI-IM) resource patterns associated with a first radio access technology (RAT). Each of the CSI-IM resource patterns corresponds to a time and frequency location in a resource block of a neighbor cell associated with a second RAT. The apparatus can also transmit one or more CSI reports based on the reporting configuration(s) and the resource configuration(s).

In yet other aspects of the present disclosure, an apparatus for wireless communications at a base station associated with a first radio access technology (RAT) includes a processor and memory coupled with the processor. Instructions stored in the memory are operable, when executed by the processor, to cause the apparatus to configure at least one reporting configuration and resource configuration for a number of CSI-IM resource patterns associated with the first RAT. Each CSI-IM resource pattern of the number of CSI-IM resource patterns corresponds to a time and frequency location in a resource block of a neighbor cell associated with a second RAT. The apparatus can also transmit, to a UE, a message including the reporting configuration(s) and the resource configuration(s). The apparatus can further receive, from the UE, one or more CSI reports based on the transmitted message.

In still other aspects of the present disclosure, a UE for wireless communications includes means for receiving, from a base station, a message indicating at least one reporting configuration and resource configuration for a number of channel state information-interference measurement (CSI-IM) resource patterns associated with a first radio access technology (RAT). Each of the of CSI-IM resource patterns corresponds to a time and frequency location in a resource block of a neighbor cell associated with a second RAT. The UE also includes means for transmitting one or more CSI reports based on the reporting configuration(s) and the resource configuration(s).

In other aspect of the present disclosure, a base station associated with a first radio access technology (RAT) for wireless communications includes means for configuring at least one reporting configuration and resource configuration for a number of CSI-IM resource patterns associated with the first RAT. Each of the CSI-IM resource patterns corresponds to a time and frequency location in a resource block of a neighbor cell associated with a second RAT. The base station also includes means for transmitting, to a UE, a message indicating the reporting configuration(s) and the resource configuration(s). The base station further includes means for receiving, from the UE, one or more CSI reports based on the transmitted message.

In aspects of the present disclosure, a non-transitory computer-readable medium with program code recorded thereon is disclosed. The program code is executed by a UE and includes program code to receive, from a base station, a message comprising at least one reporting configuration and resource configuration for a number of channel state information-interference measurement (CSI-IM) resource patterns associated with a first radio access technology (RAT). Each of the of CSI-IM resource patterns corresponds to a time and frequency location in a resource block of a neighbor cell associated with a second RAT. The UE also includes program code to transmit one or more CSI reports based on the reporting configuration(s) and the resource configuration(s).

In other aspect of the present disclosure, a non-transitory computer-readable medium with program code recorded thereon is disclosed. The program code is executed by a base station associated with a first radio access technology (RAT) and includes program code to configure at least one reporting configuration and resource configuration for a number of CSI-IM resource patterns associated with the first RAT. Each of the CSI-IM resource patterns corresponds to a time and frequency location in a resource block of a neighbor cell associated with a second RAT. The base station also includes program code to transmit, to a UE, a message indicating the reporting configuration(s) and the resource configuration(s). The base station further includes program code to receive, from the UE, one or more CSI reports based on the transmitted message.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 7 is a flow diagram illustrating an example process performed, for example, by a UE, in accordance with various aspects of the present disclosure.

DETAILED DESCRIPTION

Figure 1:
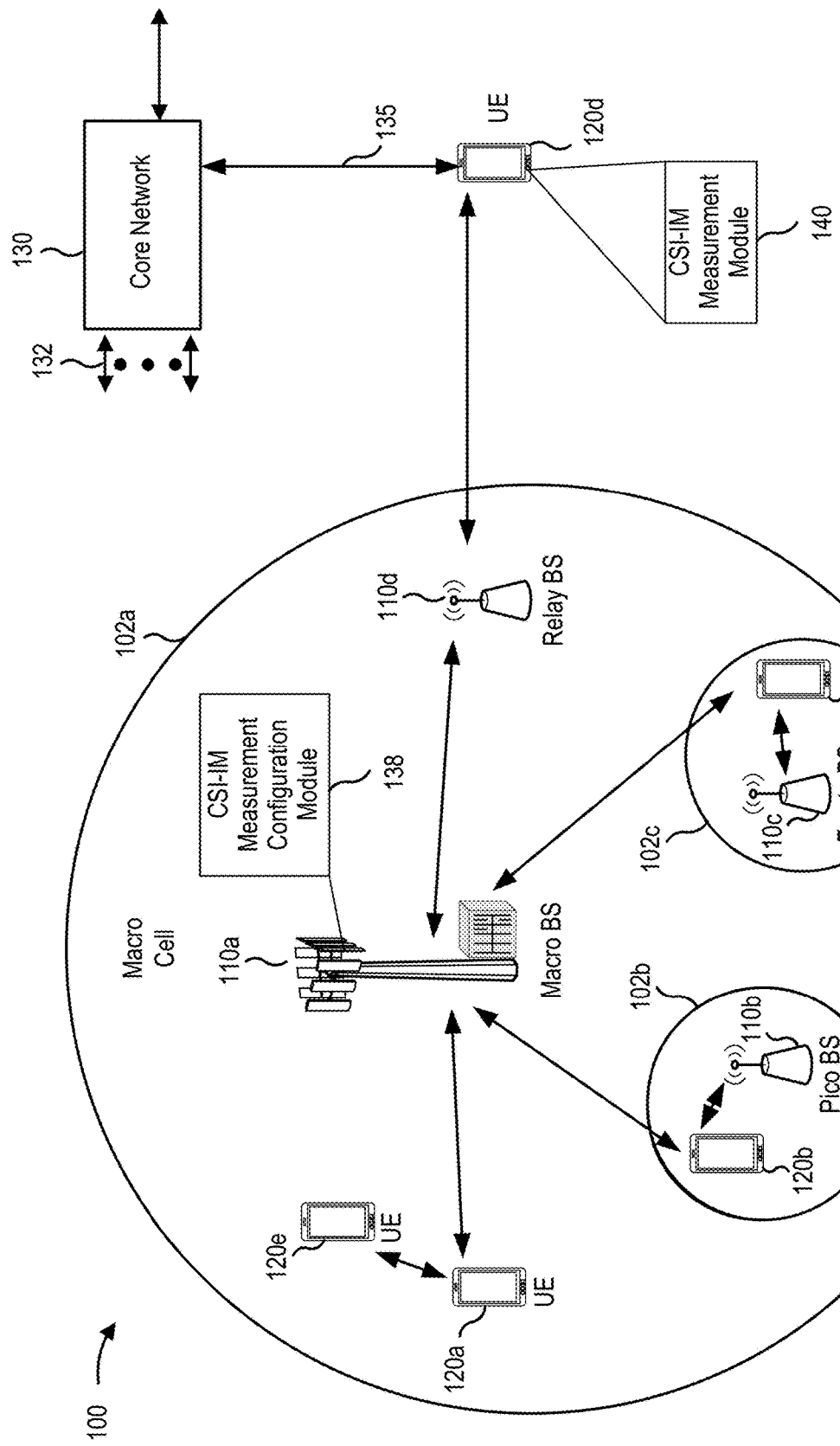
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Dynamic spectrum sharing (DSS) may be enabled in some wireless systems. In these systems, operators may use the same spectrum bands for different radio access technologies (RATs). For example, long-term evolution (LTE) and new radio (NR) systems may use the same spectrum bands. In systems where DSS is enabled, cell-specific reference signals (CRS) from a neighbor LTE cell may interfere with data messages transmitted on an NR physical downlink shared channel (PDSCH). The interference may occur when a frequency shift parameter (vShift) of a neighbor cell of a RAT (e.g., LTE) is different from a vShift of a serving cell of the RAT. The vShift defines a frequency shift pattern for CRS resource elements (REs). That is, the CRS REs of the neighbor cell do not collide with CRS REs of the serving cell due to the different vShifts.

When DSS is enabled, NR UEs may report a high rank and/or a high channel quality indicator (CQI). The high rank and/or CQI may be reported even when the NR UEs experience CRS interference. In some cases, the network configures channel state information-interference measurements (CSI-IMs) to detect LTE PDSCH interference symbols rather than the LTE CRS symbols. Thus, the interference estimates may not accurately reflect the effects of a neighboring cell's CRS. The impact of LTE CRS interference may be more prevalent in cell-edge conditions.

Aspects of the present disclosure are directed to measuring LTE CRSs to identify CRS interference. In some configurations, a base station configures a set of CSI-IM resources for a UE associated with a first radio access technology (RAT), such as NR. Each CSI-IM resource may be associated with a time and frequency location in a slot to overlap one or more CRS resource elements of a neighbor cell associated with a second RAT, such as LTE. The base station may activate one or more CSI-IMs and/or request one or more CSI reports based on a neighbor cell measurement report. The neighbor cell measurement report provides information about the neighbor cell signal strength. The CSI report carries information about the channel estimate and interference estimate. The network may request a UE to report a specific CSI report based on the signal strength measurement of the neighboring cell.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130). The UEs 120 (e.g., 120a, 120b, 120c) may communicate with the core network 130 through a communications link 135.

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless communications system 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a channel state information-interference measurement (CSI-IM) measurement module 140. For brevity, only one UE 120d is shown as including the CSI-IM measurement module 140. The CSI-IM measurement module 140 may receive, from a base station, a message including at least one reporting configuration and resource configuration for a number of CSI-IM resource patterns associated with a first radio access technology (RAT). Each CSI-IM resource pattern may correspond to a time and frequency location in a resource block of a neighbor cell associated with a second RAT. The CSI-IM measurement module 140 may also transmit one or more CSI reports based on the reporting configuration(s) and the resource configuration(s).

The core network 130 or the base stations 110 may include a CSI-IM measurement configuration module 138 for configuring at least one reporting configuration and resource configuration for a number of CSI-IM resource patterns associated with the first RAT. Each CSI-IM resource pattern of the number of CSI-IM resource patterns corresponds to a time and frequency location in a resource block of a neighbor cell associated with a second RAT. The CSI-IM measurement configuration module 138 also transmits, to a UE, a message indicating the reporting configuration(s) and the resource configuration(s). The CSI-IM measurement configuration module 138 may also receive, from the UE, one or more CSI reports based on the transmitted message.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
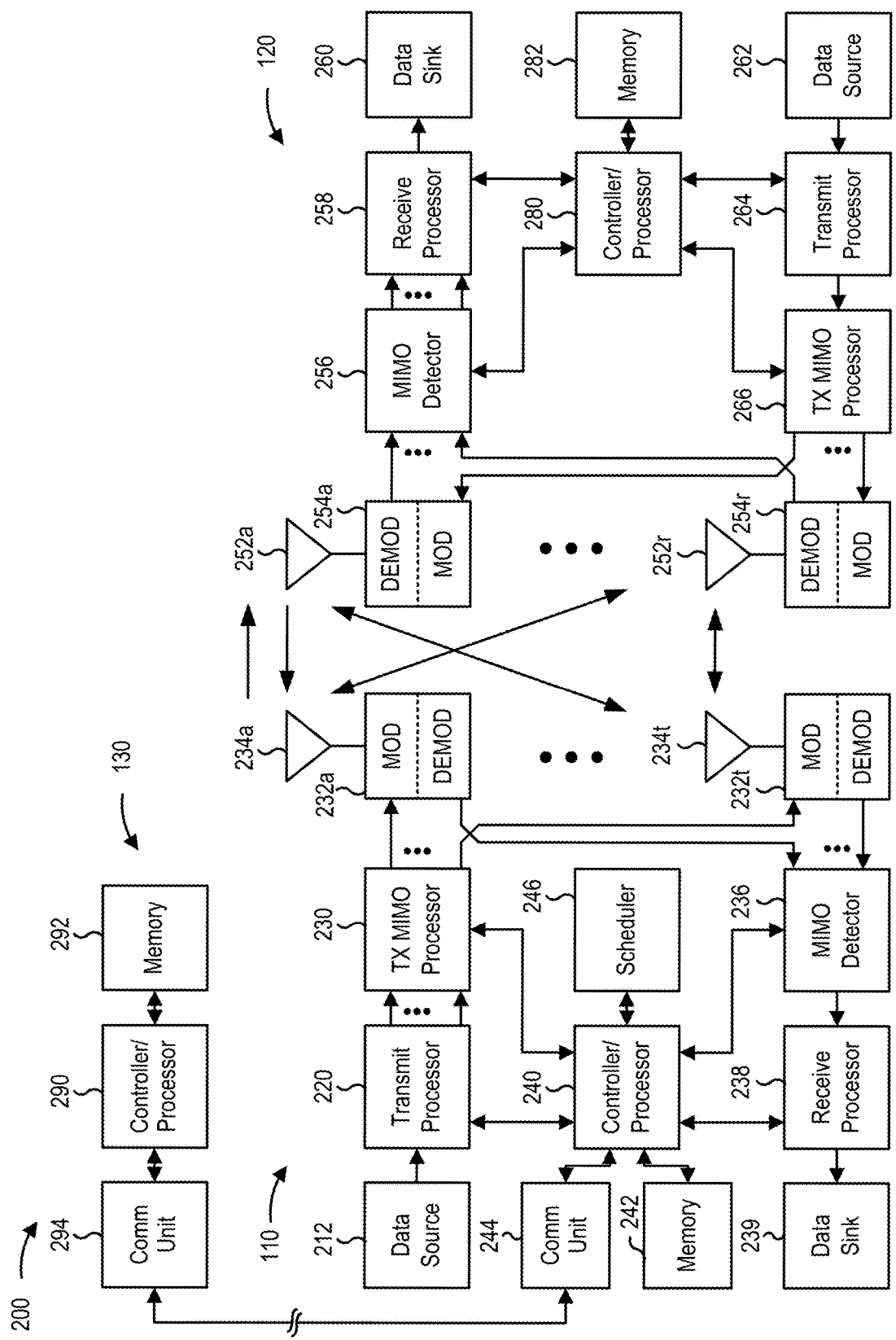
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with determining CRS interference of a neighbor cell based on one or more CSI-IM resource patterns as described in more detail elsewhere. For example, the controller/processor 240 of the base station 110, the controller/processor 280 of the UE 120, and/or any other component(s) of FIG. 2 may perform or direct operations of, for example, the process of FIGS. 7-8 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving, means for measuring, and/or means for transmitting. In some aspects, the base station 110 may include means for configuring, means for transmitting, means for receiving, means for selecting, and/or means for scheduling. Such means may include one or more components of the UE 120 or base station 110 described in connection with FIG. 2.

As indicated above, FIG. 2 is provided merely as an example. Other examples may differ from what is described with regard to FIG. 2.

Dynamic spectrum sharing (DSS) may be enabled in some wireless systems. In these systems, operators may use the same spectrum bands for different radio access technologies (RATs). For example, long-term evolution (LTE) and NR systems may use the same spectrum bands. In systems where DSS is enabled, cell-specific reference signals (CRSs) from a neighbor cell (e.g., LTE neighbor cell) may interfere with data messages transmitted on an NR physical downlink shared channel (PDSCH). The interference may occur when a frequency shift parameter (vShift) of a neighbor cell is different from a vShift of a serving cell (e.g., LTE serving cell). That is, the CRSs of the neighbor cell do not collide with CRSs of the serving cell.

When DSS is enabled, NR UEs may report a high rank and/or a high channel quality indicator (CQI) even when the NR UEs experience CRS interference. In some cases, the network configures channel state information-interference measurements (CSI-IMs) to detect LTE PDSCH interference symbols rather than the LTE CRS symbols. Thus, the interference estimates may not accurately reflect the effects of a neighboring cell's CRS. The impact of LTE CRS interference may be more prevalent in cell-edge conditions.

According to aspects of the present disclosure, a network (e.g., NR base station) may align one or more NR CSI-IM resources with LTE CRS resource elements (REs). The NR CSI-IM resources may be from a serving cell, and the LTE CRS REs may be from one or more neighbor cells. As described, the vShift of the serving cell is different from the vShift of the neighbor cells. According to aspects of the present disclosure, the network may activate or deactivate CSI-IM resources and/or measurement reports (e.g., CSI reports) based on neighbor cell measurement reports, such as a signal strength measurement.

Figure 3A:
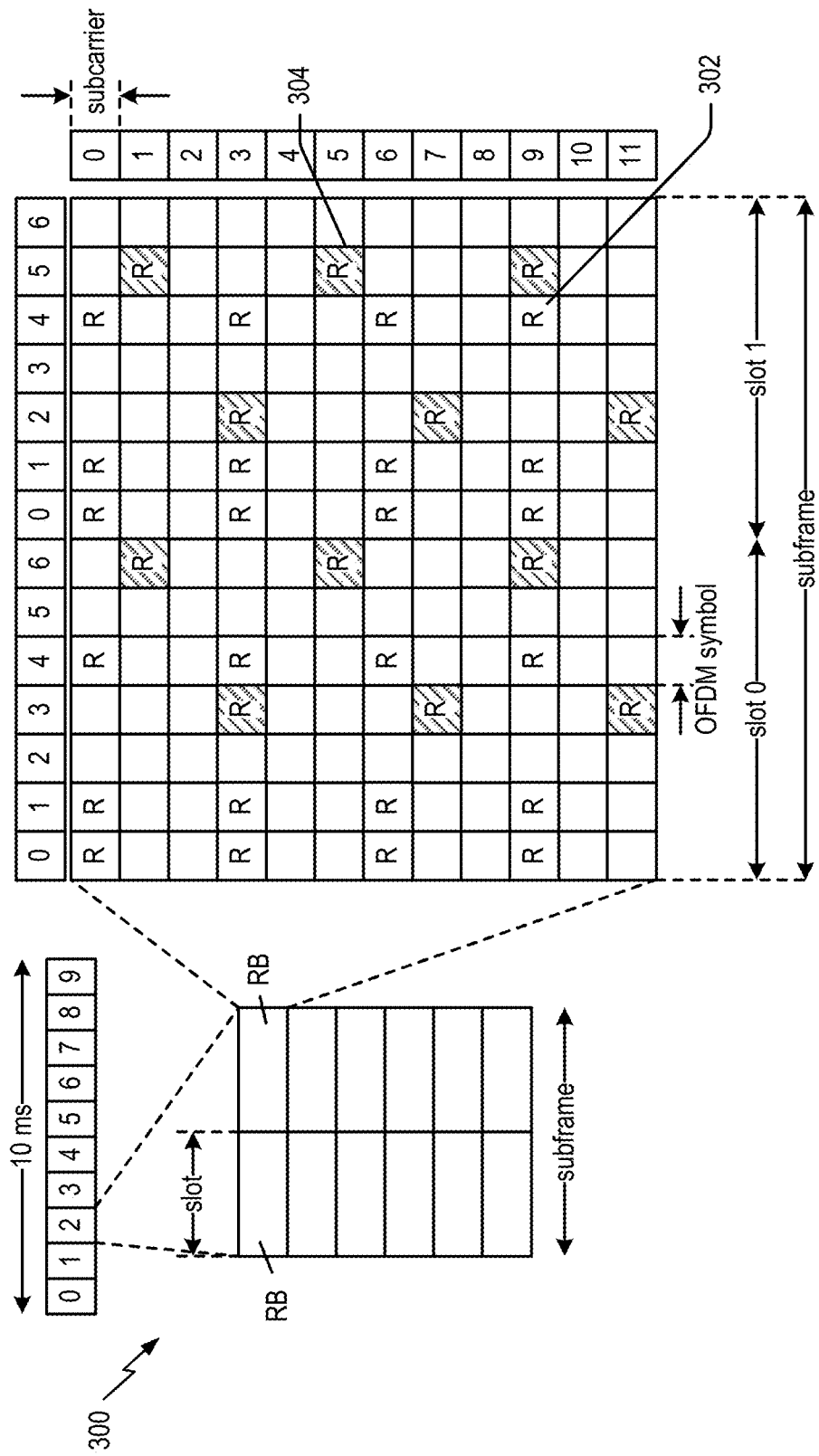
FIG. 3A is a diagram illustrating an example of a downlink (DL) frame structure in a wireless communication system, such as an LTE communication system.

FIG. 3A is a diagram 300 illustrating an example of a downlink (DL) frame structure in a wireless communication system, such as an LTE communication system. A frame (10 ms) may be divided into ten equally sized sub-frames. Each sub-frame may include two consecutive time slots. A resource grid may represent two time slots, each time slot including resource blocks divided into multiple resource elements. In LTE, a resource block contains twelve consecutive subcarriers in the frequency domain and, for a normal cyclic prefix in each orthogonal frequency-division multiplexing (OFDM) symbol, seven consecutive OFDM symbols in the time domain, or 84 resource elements. For an extended cyclic prefix, a resource block contains six consecutive OFDM symbols in the time domain and has 72 resource elements. Some of the resource elements, shown as 'R' 302, 304, include DL reference signals (DL-RSs). The DL-RSs may include a cell-specific RS (CRS) 302 and a UE-specific RS (UE-RS) 304. In the example of FIG. 3A, for symbols allocated to data, resource elements that do not include a reference signal 302, 304 may be allocated to a data channel (e.g., PDSCH). The number of bits carried by each resource element depends on the modulation scheme.

As shown in FIG. 3A, resource elements of some symbols, such as symbol 3 in slot 0, may map to reference signals, such as CRS and a data channel (e.g., PDSCH). Additionally, resource elements of other symbols, such as symbol 5 of slot 0, may only map to a data channel (e.g., PDSCH). In wireless communication systems, such as LTE and NR, the UE determines a ratio of a transmit power of the PDSCH to a transmit power of CRSs. In some cases, a transmit power of a CRS may be greater than a transmit power of a data channel. Additionally, the transmit power of the data channel may differ based on whether the data channel maps to a symbol including CRSs or a symbol without CRSs. The PDSCH may be demodulated based on the PDSCH/CRS power ratio. The UE may determine the PDSCH/CRS power ratio via higher layer signaling. A power allocated to CRS REs is controlled with respect to the PDSCH via parameter settings $\rho_A$ and $\rho_B$.

Figure 3B:
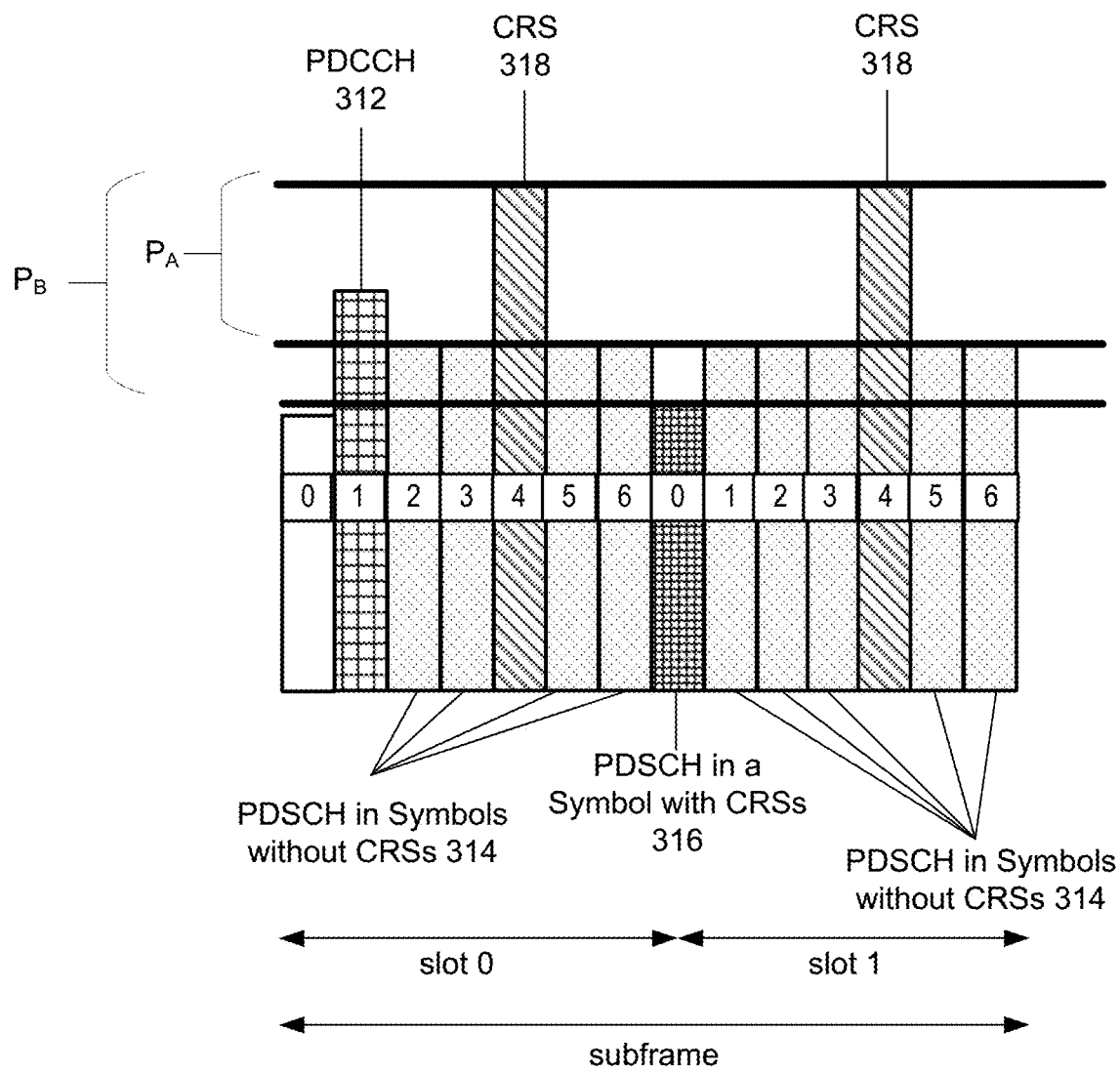
FIG. 3B is a diagram illustrating an example of a power ratio between a reference signal and a shared data channel signal in a subcarrier of a subframe.

FIG. 3B is a diagram illustrating an example of a power ratio between a reference signal and a shared data channel signal in a subcarrier, such as subcarrier 11, of a subframe. FIG. 3B is for illustrative purposes, showing the mapping of the CRS and the PDSCH differs from the mapping of FIG. 3A. As shown in the example of FIG. 3B, PDSCH resource elements may be allocated to a set of symbols 314 without reference signals (e.g., CRSs). Additionally, in the example of FIG. 3B, for the subcarrier, symbol 0 of slot 1 includes a PDSCH resource element 316 allocated to a symbol with CRSs. Furthermore, in the current example, for the subcarrier, the resource elements in symbol 4 of slots 0 and 1 are allocated to a CRS 318. Finally, symbol 1 of slot 0 maps to a physical downlink control channel (PDCCH) 312. As shown in FIG. 3B, $\rho_A$ is a power ratio between power allocated to the PDSCH resource elements from the set of symbols 314 without CRSs and power allocated to the CRS resource elements 318. The parameter $\rho_B$ is a power ratio between power allocated to the PDSCH resource elements 316 allocated to a symbol with CRSs and power allocated to the PDSCH resource elements from the set of symbols 314 without the CRS resource elements.

A network may provide stable power across symbols of a subframe by adjusting the parameters $\rho_A$ and $\rho_B$. As described, NR transmissions may experience interference from LTE CRS resources. In some cases, NR channel state feedback (CSF) interference measurements are based on power measurements from four resource elements.

Figure 4:
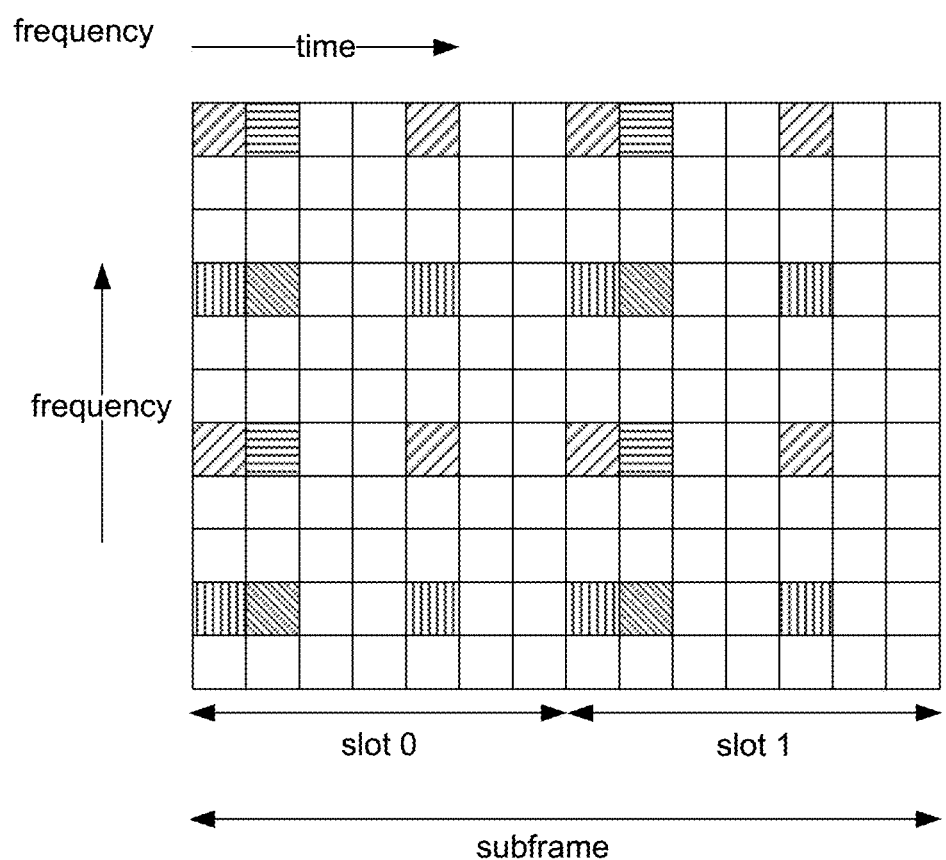
FIG. 4 is a diagram illustrating an example of four-port cell reference signal (CRS) patterns for a subframe.

In some cases, the CRS may be transmitted via multiple antenna ports of a base station. For example, the base station may use a four-port CRS pattern, where a different CRS pattern is allocated to each port. FIG. 4 is a diagram illustrating an example of four-port CRS patterns for a subframe. As shown in FIG. 4, the CRS transmission for CRS ports 0 and 1 are defined to be transmitted on the same OFDM symbol. Additionally, the CRS transmission for CRS ports 2 and 3 are transmitted on the same OFDM symbol (different from OFDM symbols containing CRS ports 0 and 1). In some examples, in a four-antenna system, antenna 1 is mapped to port 0, antenna 2 is mapped to port 1, etc.

Figures 5A, 5B:
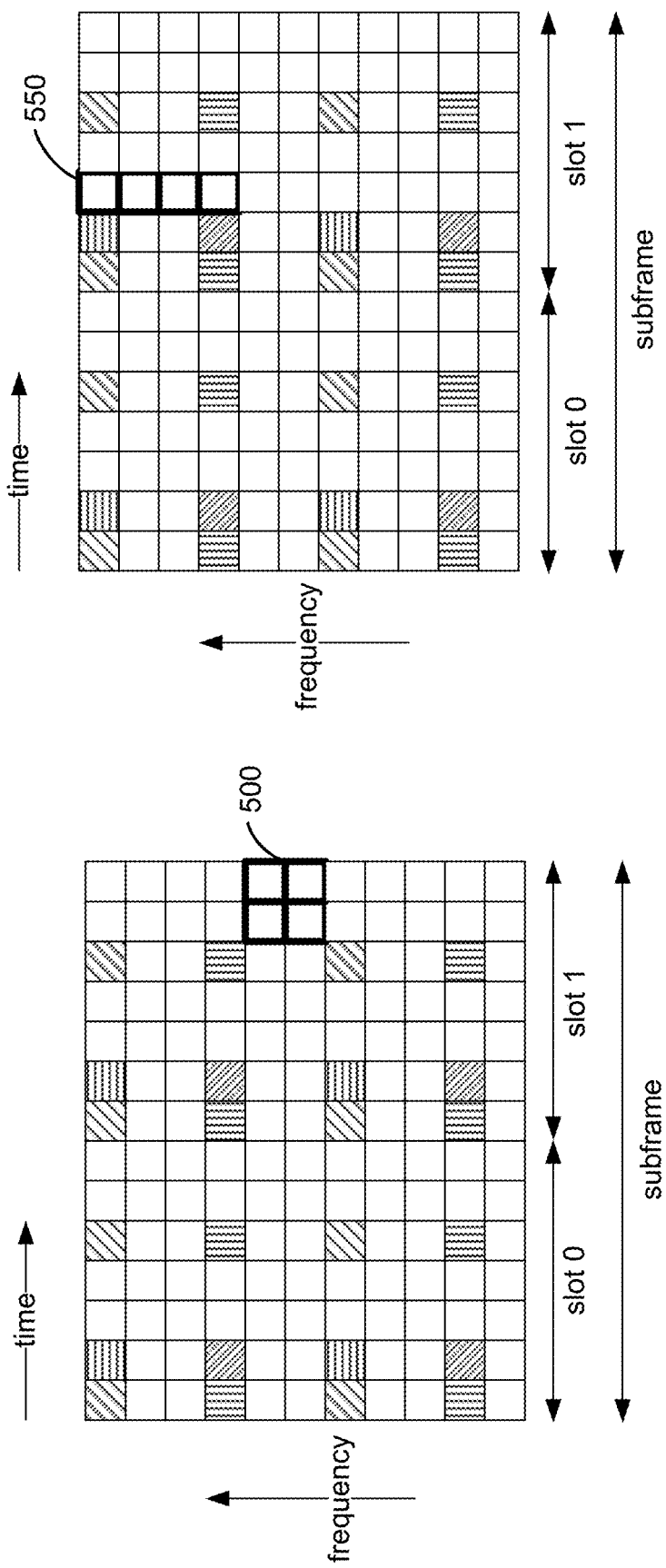
FIG. 5A is a diagram illustrating an example of a first channel state information-interference measurement (CSI-IM) resource pattern.
FIG. 5B is a diagram illustrating an example of a second CSI-IM resource pattern.

NR systems may use channel state information-interference measurement (CSI-IM) resources to measure interference. Radio resource control (RRC) signaling may configure a first CSI-IM resource pattern (e.g., pattern 0) or a second CSI-IM resource pattern (e.g., pattern 1). FIG. 5A is a diagram illustrating an example of a first CSI-IM resource pattern 500. As shown in FIG. 5A, the first CSI-IM resource pattern 500 overlaps two resource elements in one symbol of a resource block and two resource elements in an adjacent symbol of the resource block. The first CSI-IM resource pattern 500 may capture one or two resource elements in a resource block with CRS interference from a neighbor cell. The number of captured resource elements may depend on a number of CRS ports and a location (e.g., a time and frequency location) of the CSI-IM. In some configurations, the network configures a location of the CSI-IM such that the CSI-IM does not capture the CRS power of a serving cell of a neighbor RAT, such as an LTE serving cell.

FIG. 5B is a diagram illustrating an example of a second CSI-IM resource pattern 550. As shown in FIG. 5B, the second CSI-IM resource pattern 550 overlaps four resource elements in one symbol of a resource block. The second CSI-IM resource pattern 550 may capture the CRS power for a multi-port CRS of the serving cell. Therefore, the second CSI-IM resource pattern 550 may not provide accurate CRS power measurements of a neighbor cell when the serving cell has more than one LTE CRS port. That is, the second CSI-IM resource pattern 550 may be useful if the neighbor cell has non-colliding CRSs and the serving cell has one LTE CRS port.

According to aspects of the present disclosure, a network may configure a set of channel state information-interference measurement (CSI-IM) resources associated with a first radio access technology (RAT), such as NR. Each CSI-IM resource from the set of CSI-IM resources corresponds to a time and frequency location in a resource block, or slot of the resource block, such that each CSI-IM resource overlaps one or more cell-specific reference signals (CRSs) of a neighbor cell associated with a second RAT, such as LTE. The UE may transmit a measurement report based on the configured set of CSI-IM resources.

The measurement report may include an interference measurement including a total interference power measured by the configured CSI-IM resource (e.g., CSI-IM resource pattern). For ease of explanation, the following examples assume interference is experienced from a neighbor cell with a four-port CRS, and a downlink shared channel (e.g., PDSCH) with flat fading, although the present disclosure is not so limited. As described in the following examples, a total interference power measured may vary based on a location of the CSI-IM resource pattern and neighbor cell downlink power allocation settings.

Figure 6A:
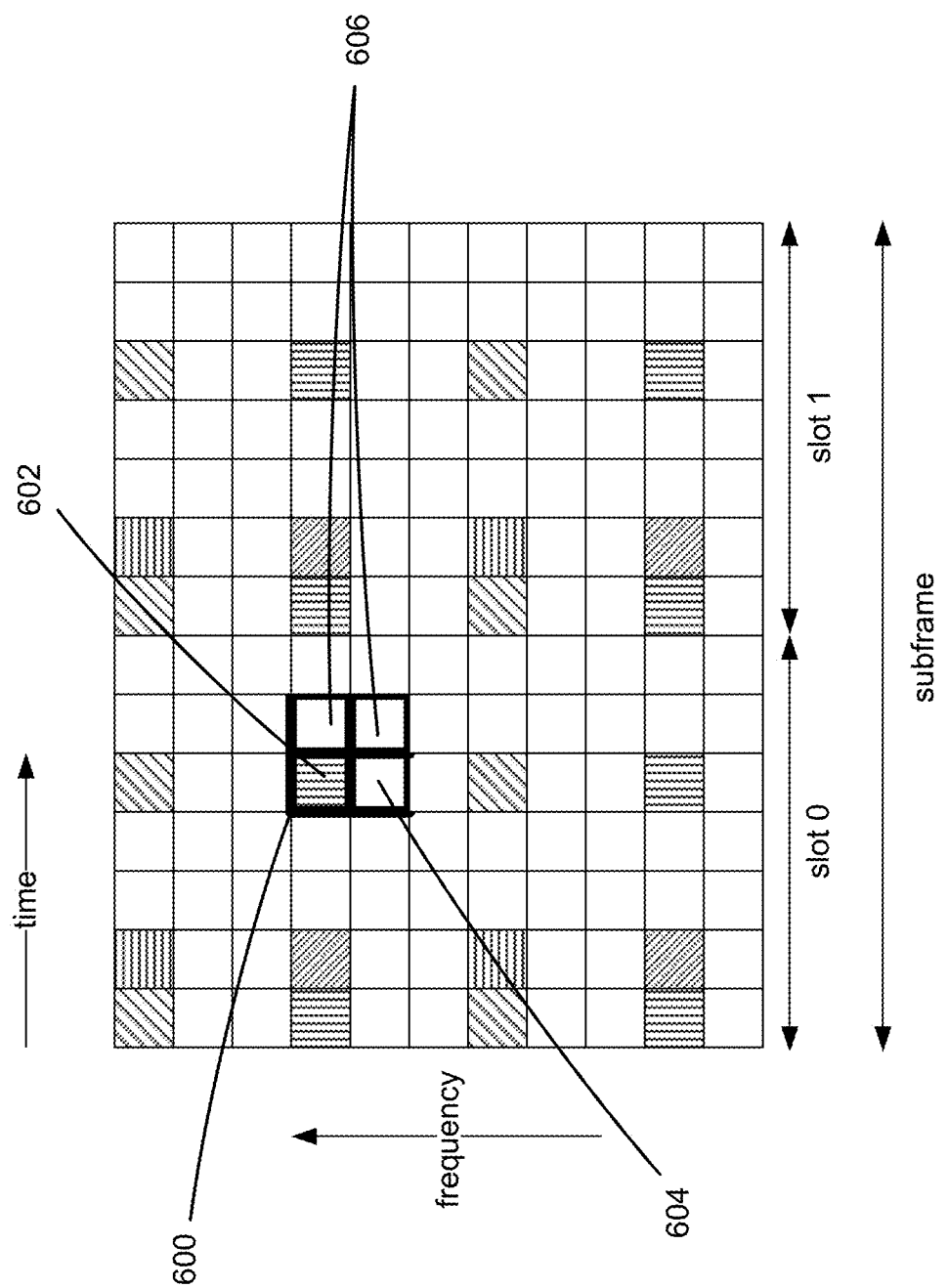
FIG. 6A illustrates an example of placing a CSI-IM resource pattern in symbol four of a resource block, in accordance with aspects of the present disclosure.

FIG. 6A illustrates an example of placing a CSI-IM resource pattern 600 in symbol four of a resource block, in accordance with aspects of the present disclosure. In the example of FIG. 6A, the network activates the CSI-IM resource pattern 600 configured for a location in symbol four of a resource block of a neighbor cell with a four-port CRS configuration, such as the configuration described with reference to FIG. 4. As shown in FIG. 6A, the CSI-IM resource pattern 600 overlaps one CRS resource element (RE) 602 ($P_{CRS}$) (where $P_{CRS}$ represents energy power per resource element (EPRE) of CRS tones), one PDSCH RE 604 in a CRS symbol ($P_{PDSCH_{CRS}}$) (where $P_{PDSCH_{CRS}}$ represents EPRE of PDSCH tones with CRS present in their symbol), and two PDSCH REs 606 ($P_{PDSCH}$) (where $P_{PDSCH}$ represents EPRE of PDSCH tones in symbols with CRS REs). In this example, the total interference power measured by the CSI-IM resource pattern 600 is a total interference power of the REs aligned with the CSI-IM resource pattern 600. The interference power of a PDSCH RE in a CRS symbol ($P_{PDSCH_{CRS}}$) may be a product of a power ratio ($\rho_B$) and an interference power of a CRS resource element ($\rho_B * P_{CRS}$). Additionally, the interference power of a PDSCH RE in a PDSCH symbol ($P_{PDSCH}$) may be a product of a power ratio ($P_A$) and an interference power of a CRS resource element ($\rho_A * P_{CRS}$). In the example of FIG. 6A, the total interference power may be determined as follows:

$$\text{Total interference power of } CSI\text{-}IM \ REs = P_{CRS} + P_{PDSCH_{CRS}} + \quad (1)$$
$$(2 * P_{PDSCH})$$
$$= P_{CRS} + (\rho_B * P_{CRS}) +$$
$$(2 * \rho_A * P_{CRS})$$
$$= P_{CRS} * (1 + \rho_B + (2 * \rho_A)).$$

Figure 6B:
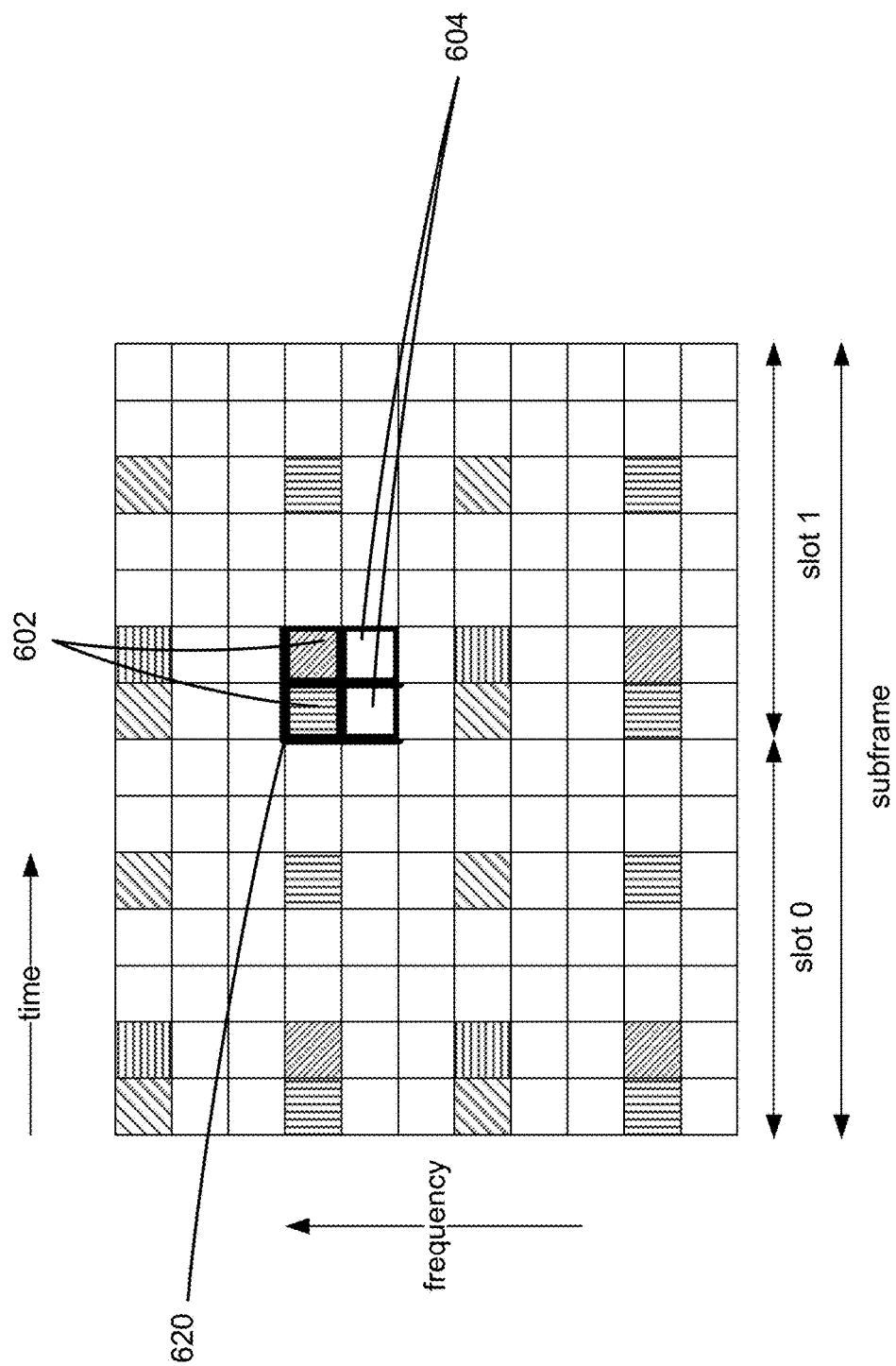
FIG. 6B illustrates an example of placing a CSI-IM resource pattern in symbol zero of slot one of a resource block, in accordance with aspects of the present disclosure.

FIG. 6B illustrates an example of placing a CSI-IM resource pattern 620 in symbol zero of slot one of a resource block, in accordance with aspects of the present disclosure. In the example of FIG. 6B, the network activates the CSI-IM resource pattern 620 configured for a location in symbol zero of slot one of a resource block of the neighbor cell with the four-port CRS configuration, such as the configuration described with reference to FIG. 4. As shown in FIG. 6B, the CSI-IM resource pattern 620 overlaps two CRS REs 602 ($P_{CRS}$) and two PDSCH REs 604 in a CRS symbol ($P_{PDSCH_{CRS}}$). In this example, the total interference power measured by the CSI-IM resource pattern 620 is a total interference power of the REs aligned with the CSI-IM resource pattern 620. In the example of FIG. 6B, the total interference power may be determined as follows:

$$\text{Total interference power of } CSI\text{-}IM \ REs = (2 * P_{CRS}) + \quad (2)$$
$$(2 * P_{PDSCH_{CRS}})$$
$$= (2 * P_{CRS}) +$$
$$(2 * \rho_B * P_{CRS})$$
$$= 2 * P_{CRS} * (1 + \rho_B).$$

Figure 6C:
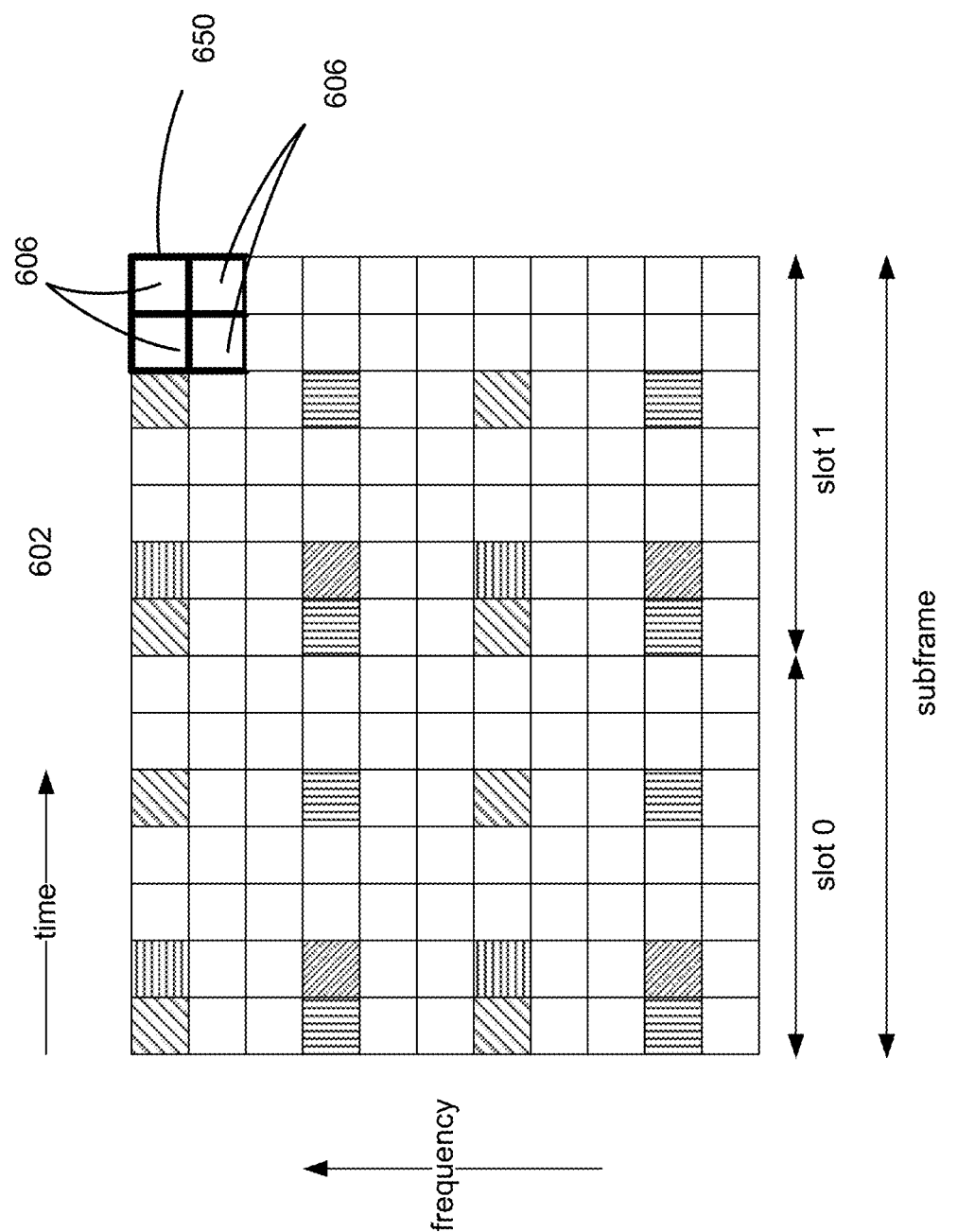
FIG. 6C illustrates an example of placing a CSI-IM resource pattern in a physical downlink shared channel (PDSCH) symbol of a resource block belonging to a second RAT, in accordance with aspects of the present disclosure.

FIG. 6C illustrates an example of placing a CSI-IM resource pattern 650 in a PDSCH symbol of a resource block belonging to a second RAT, in accordance with aspects of the present disclosure. In the example of FIG. 6C, the network activates the CSI-IM resource pattern 650 configured for a location in one of the PDSCH symbols of a resource block of the neighbor cell with the four-port CRS configuration, such as the configuration described with reference to FIG. 4. As shown in FIG. 6C, the CSI-IM resource pattern 650 aligns with four PDSCH REs 606 ($P_{PDSCH}$). In the example of FIG. 6C, the total interference power may be determined as follows:

$$\text{Total interference power of } CSI\text{-}IM \ REs = 2 * P_{PDSCH} \quad (3)$$
$$= 4 * P_{CRS} * \rho_A$$

Aspects of the present disclosure are not limited to configuring the CSI-IM in the locations shown in FIGS. 6A-6C, different locations may be configured within a resource block.

According to aspects of the present disclosure, a base station configures at least one reporting configuration and resource configuration for multiple channel state information-interference measurement (CSI-IM) resource patterns associated with a first radio access technology (RAT), such as NR. The multiple CSI-IM resource patterns may be patterns such as the CSI-IM resource patterns 600, 620, 650 described with reference to FIGS. 6A, 6B, and 6C. In these configurations, each configured CSI-IM resource pattern corresponds to a time and frequency location in a resource block of a neighbor cell associated with a second RAT, such as LTE. The base station may transmit, to a UE, a message indicating the reporting configuration(s) and the resource configuration(s). In some configurations, the base station may indicate multiple reporting configurations and resource configurations to the UE.

The reporting configuration configures a reporting periodicity for one or more measurement reports. Each measurement report may correspond to one or more CSI-IM resource patterns of the configured CSI-IM resource patterns. Additionally, each measurement report includes an interference measurement based on a total interference power of a set of resource elements (REs) of the resource blocks aligned with a time and frequency location of each CSI-IM resource pattern corresponding to the measurement report. As described above, the set of REs includes one or more of a cell-specific reference signal (CRS) RE of one or more neighbor cells, a physical downlink shared channel (PDSCH) RE in a symbol including CRS REs of one or more neighbor cells, or a PDSCH RE in a symbol without CRS REs of one or more neighbor cells.

In some configurations, the reporting configuration is periodic. In these configurations, the base station configures the UE to measure the REs aligned with each CSI-IM resource pattern of the configured CSI-IM resource patterns. Additionally, the UE transmits each configured measurement report corresponding to the one or more CSI-IM resource patterns. The base station may select, or prioritize, one or more received measurement reports based on neighbor cell measurements, such as a signal strength measurement, reported by the UE. Additionally, the base station schedules future UE communication based on the interference measurement of the one or more selected measurement report (e.g., CSI reports).

In other configurations, the base station schedules the UE for semi-persistent reporting. In these configurations, the base station may activate or deactivate one or more CSI-IM resource patterns and corresponding measurement reports based on neighbor cell measurement reports (e.g., signal strength measurements) transmitted by the UE. That is, the UE may receive a signal for activating (e.g., triggering) a set of measurement reports and a set of CSI-IM resource patterns corresponding to the set of measurement reports. The set of measurement reports may include one or more measurement reports. The set of CSI-IM resource patterns may include one or more CSI-IM resource patterns. For the selected CSI-IM resource pattern(s) of the set of CSI-IM resource patterns, the UE may measure a total interference power of the set of REs aligned with the time and frequency location of the selected CSI-IM resource pattern(s). The UE may report the set of measurement reports to the base station.

In yet other configurations, the base station schedules the UE for aperiodic reporting. As described above, the UE may be configured with a number of CSI-IM resources, where each CSI-IM resource is specified for a frequency domain and time domain (e.g., symbol) location. In these configurations, the base station triggers the UE to measure a set of CSI-IM resources and report one or more corresponding measurement reports based on neighbor cell measurement reports transmitted by the UE.

As indicated above, FIGS. 3A, 3B, 4, 5A, 5B, 6A, 6B, and 6C are provided as examples. Other examples may differ from what is described with respect to FIGS. 3A, 3B, 4, 5A, 5B, 6A, 6B, and 6C.

FIG. 7 is a flow diagram illustrating an example process 700 performed, for example, by a UE, in accordance with various aspects of the present disclosure. The example process 700 is an example of first RAT channel state feedback (CSF) to increase an accuracy of interference estimates from second RAT neighbor cells with dynamic spectrum sharing (DSS).

As shown in FIG. 7, in some aspects, the process 700 may include receiving, from a base station, a message indicating at least one reporting configuration and resource configuration for a number of channel state information-interference measurement (CSI-IM) resource patterns associated with a first radio access technology (RAT) (block 702). The reporting configuration(s) may be transmitted via RRC signaling and may configure a reporting periodicity for a number of CSI reports, where each CSI report may correspond to one or more CSI-IM resource patterns, such as the CSI-IM resource patterns 600, 620, 650 described with reference to FIGS. 6A, 6B, and 6C. That is, each CSI-IM resource pattern of the number of CSI-IM resource patterns corresponds to a time and frequency location in a resource block of a neighbor cell associated with a second RAT. In one configuration, the reporting periodicity is periodic. In another configuration, the reporting periodicity is semi-persistent. In yet another configuration, the reporting periodicity is aperiodic. In one example, the user equipment (UE) (e.g., using the antenna 252, DEMOD/MOD 254, MIMO detector 256, receive processor 258, controller/processor 280, and/or memory 282) can receive the message indicating a reporting configuration.

As shown in FIG. 7, in some aspects, the process 700 may include transmitting one or more CSI reports based on the reporting configuration(s) and the resource configuration(s) (block 704). According to aspects of the present disclosure, the CSI report includes an interference measurement based on a total interference power of a set of resource elements (REs) of the resource blocks aligned with a time and frequency location of the one or more CSI-IM resource patterns corresponding to the CSI report. As described in EQUATIONS 1, 2, and 3, the set of REs may include one or more of a cell-specific reference signal (CRS) RE, one or more of a first PDSCH RE in a symbol including CRS REs, and/or one or more of a second PDSCH RE in a symbol without CRS REs. In one configuration, for the periodic reporting periodicity, the UE transmits each CSI report of the number of CSI reports according to the periodic reporting periodicity. In this configuration, the UE measures the interference measurement for each CSI-IM resource pattern of the configured CSI-IM resource patterns.

In another configuration, for the semi-persistent reporting periodicity, the UE transmits each CSI report of a set of CSI reports identified from the number of CSI reports according to the semi-persistent reporting periodicity. In this configuration, the UE receives a signal for activating the set of CSI reports and a set of CSI-IM resource patterns corresponding to the set of CSI reports. Additionally, in this configuration, the UE measures the interference power for each CSI-IM resource pattern of the set of configured CSI-IM resource patterns.

In yet another configuration, for the aperiodic reporting periodicity, the UE transmits each CSI report of a set of CSI reports identified from the number of CSI reports in response to a trigger. In this configuration, the UE receiver the trigger for triggering the set of CSI reports and a set of CSI-IM resource patterns corresponding to the set of CSI reports. Additionally, in this configuration, the UE measures the interference power for each CSI-IM resource pattern of the set of configured CSI-IM resource patterns.

As an example, the UE (e.g., using the antenna 252, DEMOD/MOD 254, TX MIMO processor 266, transmit processor 264, controller/processor 280, and/or memory 282) may transmit one or more CSI reports based on the reporting configuration(s) and the resource configuration(s).

Figure 8:
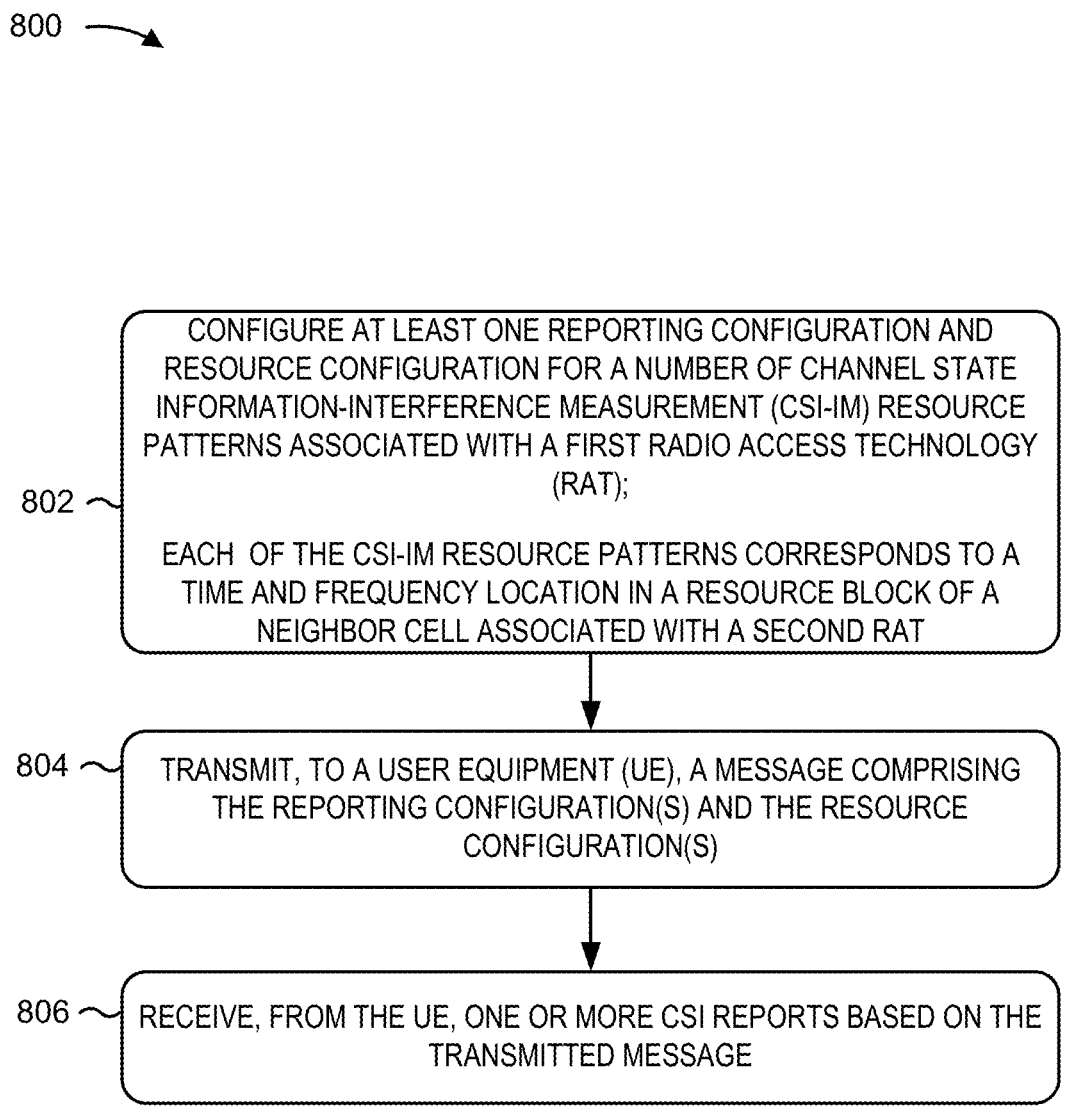
FIG. 8 is a flow diagram illustrating an example process performed, for example, by a base station, in accordance with various aspects of the present disclosure.

FIG. 8 is a flow diagram illustrating an example process 800 performed, for example, by a base station, in accordance with various aspects of the present disclosure. The example process 800 is an example of first RAT channel state feedback (CSF) to increase an accuracy of interference estimates from second RAT neighbor cells with dynamic spectrum sharing (DSS).

As shown in FIG. 8, in some aspects, the process 800 may include configuring at least one reporting configuration and resource configuration for a number of channel state information-interference measurement (CSI-IM) resource patterns associated with the first RAT (block 802). In one configuration, each CSI-IM resource pattern of the number of CSI-IM resource patterns corresponding to a different time and frequency location in a resource block of a neighbor cell associated with a second RAT. In one configuration, the reporting configuration configures a reporting periodicity for a number of CSI reports. The reporting periodicity may be periodic, aperiodic, or semi-persistent. Additionally, each CSI report may correspond to one or more CSI-IM resource patterns, such as the CSI-IM resource patterns 600, 620, 650 described with reference to FIGS. 6A, 6B, and 6C.

As an example, the base station (e.g., using the antenna 234, MOD/DEMOD 232, TX MIMO processor 230, transmit processor 220, controller/processor 240, and/or memory 242) can configure the reporting configuration(s) and resource configuration(s).

As shown in FIG. 8, in some aspects, the process 800 may include transmitting, to a UE, a message comprising the reporting configuration(s) and resource configuration (block 804). The reporting configuration(s) and the resource configuration(s) may be transmitted via RRC signaling. For example, the base station (e.g., using the antenna 234, MOD/DEMOD 232, TX MIMO processor 230, transmit processor 220, controller/processor 240, and/or memory 242) can transmit a message comprising the reporting configuration(s) and the resource configuration(s).

In other aspects, the process 800 may include receiving, from the UE, one or more CSI reports based on the transmitted message (block 806). Each CSI report may include an interference measurement based on a total interference power of a set of resource elements (REs) of the resource blocks aligned with a time and frequency location of the one or more CSI-IM resource patterns corresponding to the CSI report. As described in EQUATIONS 1, 2, and 3, the set of REs may include one or more of a cell-specific reference signal (CRS) RE, one or more of a first PDSCH RE in a symbol including CRS REs, and/or one or more of a second PDSCH RE in a symbol without CRS REs. In one configuration, the base station also receives, from the UE, a signal strength measurement of the neighbor cell.

According to aspects of the present disclosure, for the periodic reporting periodicity, the base station receives each CSI report of the number of CSI reports according to the periodic reporting periodicity. In this aspect, the base station selects one or more CSI reports from the number of CSI reports based on the signal strength measurement of the neighbor cell. Additionally, the base station schedules the UE based on the interference measurement of the one or more CSI reports.

According to other aspects, for the semi-persistent reporting periodicity, the base station receives each CSI report of a set of CSI reports identified from the number of CSI reports according to the semi-persistent reporting periodicity. In these aspects, the base station may transmit a signal for activating the set of CSI reports and a set of CSI-IM resource patterns corresponding to the set of CSI reports based on the signal strength measurement of the neighbor cell.

According to yet other aspects, for the aperiodic reporting periodicity, the base station receives each CSI report of a set of CSI reports from the plurality of CSI reports in response to a trigger. In these aspects, the base station may transmit the trigger for triggering the set of CSI reports and a set of CSI-IM resource patterns corresponding to the set of CSI reports based on the signal strength measurement of the neighbor cell.

As an example, the base station (e.g., using the antenna 234, MOD/DEMOD 232, MIMO detector 236, receive processor 238, controller/processor 240, and/or memory 242) can receive the one or more CSI reports based on the transmitted message.

Implementation examples are described in the following numbered clauses.

1. A method for wireless communication performed by a user equipment (UE), comprising:
   receiving, from a base station, a message comprising at least one reporting configuration and at least one resource configuration for a plurality of channel state information-interference measurement (CSI-IM) resource patterns associated with a first radio access technology (RAT), each CSI-IM resource pattern of the plurality of CSI-IM resource patterns corresponding to a time and frequency location in a resource block of a neighbor cell associated with a second RAT; and
   transmitting at least one CSI report based on the at least one reporting configuration and the at least one resource configuration.

2. The method of clause 1, in which:
   the at least one reporting configuration configures reporting for a plurality of CSI reports, each CSI report of the plurality of CSI reports corresponding to a CSI-IM resource pattern of the plurality of CSI-IM resource patterns;
   an interference measurement of each CSI report comprises a total interference power of a set of resource elements (REs) of the resource blocks aligned with a time and frequency location of the CSI-IM resource pattern corresponding to the CSI report; and
   the set of REs comprises at least one of a cell-specific reference signal (CRS) RE, a first physical downlink shared channel (PDSCH) RE in a symbol including CRS REs, or a second PDSCH RE in a symbol without CRS REs.

3. The method of clause 1 or 2, in which:
   the at least one reporting configuration indicates a periodic reporting periodicity;
   the transmitting the at least one CSI report comprises transmitting each CSI report of the plurality of CSI reports according to the periodic reporting periodicity; and
   the method further comprises measuring the interference measurement for each CSI-IM resource pattern of the plurality of CSI-IM resource patterns.

4. The method of any of clauses 1 or 2, in which:
   the at least one reporting configuration indicates a semi-persistent reporting periodicity;
   the transmitting the at least one CSI report comprises transmitting each CSI report of a set of CSI reports from the plurality of CSI reports according to the semi-persistent reporting periodicity; and
   the method further comprises:
      receiving a signal for activating the set of CSI reports and a set of CSI-IM resource patterns corresponding to the set of CSI reports; and
      measuring the interference power for each CSI-IM resource pattern of the set of CSI-IM resource patterns.

5. The method of any of clauses 1, 2, or 4, in which CSI resources are semi-persistent resources or periodic resources.

6. The method of any of clauses 1 or 2, in which:
   the at least one reporting configuration indicates an aperiodic reporting periodicity;
   transmitting the at least one CSI report comprises transmitting each CSI report of a set of CSI reports from the plurality of CSI reports in response to a trigger; and
   the method further comprises:
      receiving the trigger for triggering the set of CSI reports and a set of CSI-IM resource patterns corresponding to the set of CSI reports; and
      measuring the interference power for each CSI-IM resource pattern of the set of CSI-IM resource patterns.

7. The method of any of clauses 1, 2, or 6, in which CSI resources are periodic resources, semi-persistent resources or aperiodic resources.

8. The method of any of the preceding clauses, in which a first frequency shift parameter (vShift) of cell-specific reference signal (CRS) resource elements (REs) of a serving cell of the second RAT is different from a second vShift of CRS REs of the neighbor cell.

9. A method for wireless communication performed by a base station associated with a first radio access technology (RAT), comprising:
- configuring at least one reporting configuration and at least one resource configuration for a plurality of channel state information-interference measurement (CSI-IM) resource patterns associated with the first RAT, each CSI-IM resource pattern of the plurality of CSI-IM resource patterns corresponding to a time and frequency location in a resource block of a neighbor cell associated with a second RAT;
- transmitting, to a user equipment (UE), a message comprising the at least one reporting configuration and the at least one resource configuration; and
- receiving, from the UE, at least one CSI report based on the transmitted message.

10. The method of clause 9, in which:
- the at least one reporting configuration configures reporting for a plurality of CSI reports, each CSI report of the plurality of CSI reports corresponding to a CSI-IM resource pattern of the plurality of CSI-IM resource patterns;
- each CSI report comprises an interference measurement based on a total interference power of a set of resource elements (REs) of the resource blocks aligned with a time and frequency location of a CSI-IM resource pattern corresponding to the CSI report;
- the set of REs comprises at least one of a cell-specific reference signal (CRS) RE, a first physical downlink shared channel (PDSCH) RE in a symbol including CRS REs, or a second PDSCH RE in a symbol without CRS REs; and
- the method further comprises receiving, from the UE, a signal strength measurement of the neighbor cell.

11. The method of clause 9 or 10, in which:
- the at least one reporting configuration indicates a periodic reporting periodicity;
- the receiving the at least one CSI report comprises receiving each CSI report of the plurality of CSI reports according to the periodic reporting periodicity; and
- the method further comprises:
  - selecting one or more CSI reports from the plurality of CSI reports based on the signal strength measurement of the neighbor cell; and
  - scheduling the UE based on the interference measurement of the one or more CSI reports.

12. The method of any of the clauses 9 or 10, in which:
- the at least one reporting configuration indicates a semi-persistent reporting periodicity;
- the receiving the at least one CSI report comprises receiving each CSI report of a set of CSI reports from the plurality of CSI reports according to the semi-persistent reporting periodicity; and
- the method further comprises transmitting a signal for activating the set of CSI reports and a set of CSI-IM resource patterns corresponding to the set of CSI reports based on the signal strength measurement of the neighbor cell.

13. The method of any of the clauses 9, 10 or 12, in which CSI resources are semi-persistent resources or periodic resources.

14. The method of any of the clauses 9 or 10, in which:
- the at least one reporting configuration indicates an aperiodic reporting periodicity;
- the receiving the at least one CSI report comprises receiving each CSI report of a set of CSI reports from the plurality of CSI reports in response to a trigger; and
- the method further comprises transmitting the trigger to trigger the set of CSI reports and a set of CSI-IM resource patterns corresponding to the set of CSI reports based on the signal strength measurement of the neighbor cell.

15. The method of any of the clauses 9, 10 or 14, in which CSI resources are periodic resources, semi-persistent resources or aperiodic resources.

16. The method of any of the clauses 9-15, in which a first frequency shift parameter (vShift) of cell-specific reference signal (CRS) resource elements (REs) of a serving cell of the second RAT is different from a second vShift of CRS REs of the neighbor cell.

17. An apparatus for wireless communications at a user equipment (UE), comprising:
- a processor;
- memory coupled with the processor; and
- instructions stored in the memory and operable, when executed by the processor, to cause the apparatus:
  - to receive, from a base station, a message comprising at least one reporting configuration and at least one resource configuration for a plurality of channel state information-interference measurement (CSI-IM) resource patterns associated with a first radio access technology (RAT), each CSI-IM resource pattern of the plurality of CSI-IM resource patterns corresponding to a time and frequency location in a resource block of a neighbor cell associated with a second RAT; and
  - to transmit at least one CSI report based on the at least one reporting configuration and the at least one resource configuration.

18. The apparatus of clause 17, in which:
- the at least one reporting configuration configures reporting for a plurality of CSI reports, each CSI report of the plurality of CSI reports corresponding to a CSI-IM resource pattern of the plurality of CSI-IM resource patterns;
- an interference measurement of each CSI report comprises a total interference power of a set of resource elements (REs) of the resource blocks aligned with a time and frequency location of a CSI-IM resource pattern corresponding to the CSI report; and
- the set of REs comprises at least one of a cell-specific reference signal (CRS) RE, a first physical downlink shared channel (PDSCH) RE in a symbol including CRS REs, or a second PDSCH RE in a symbol without CRS REs.

19. The apparatus of clause 17 or 18, in which:
- the at least one reporting configuration indicates a periodic reporting periodicity; and
- the processor causes the apparatus:
  - to transmit the at least one CSI report by transmitting each CSI report of the plurality of CSI reports according to the periodic reporting periodicity; and
  - to measure the interference measurement for each CSI-IM resource pattern of the plurality of CSI-IM resource patterns.

20. The apparatus of any of the clauses 17 or 18, in which:
- the at least one reporting configuration indicates a semi-persistent reporting periodicity; and
- the processor causes the apparatus:
  - to transmit the at least one CSI report by transmitting each CSI report of a set of CSI reports from the plurality of CSI reports according to the semi-persistent reporting periodicity;

to receive a signal for activating the set of CSI reports and a set of CSI-IM resource patterns corresponding to the set of CSI reports; and to measure the interference power for each CSI-IM resource pattern of the set of CSI-IM resource patterns.

21. The apparatus of any of the clauses 17 or 18, in which:
the at least one reporting configuration indicates an aperiodic reporting periodicity; and
the processor causes the apparatus:
to transmit the at least one CSI report by transmitting each CSI report of a set of CSI reports from the plurality of CSI reports in response to a trigger; and
to receive the trigger for triggering the set of CSI reports and a set of CSI-IM resource patterns corresponding to the set of CSI reports; and
to measure the interference power for each CSI-IM resource pattern of the set of CSI-IM resource patterns.

22. The apparatus of any of the clauses 17-21, in which a first frequency shift parameter (vShift) of cell-specific reference signal (CRS) resource elements (REs) of a serving cell of the second RAT is different from a second vShift of CRS REs of the neighbor cell.

23. An apparatus for wireless communications at a base station associated with a first radio access technology (RAT), comprising:
a processor,
memory coupled with the processor; and
instructions stored in the memory and operable, when executed by the processor, to cause the apparatus:
to configure at least one reporting configuration and at least one resource configuration for a plurality of channel state information-interference measurement (CSI-IM) resource patterns associated with the first RAT, each CSI-IM resource pattern of the plurality of CSI-IM resource patterns corresponding to a time and frequency location in a resource block of a neighbor cell associated with a second RAT;
to transmit, to a user equipment (UE), a message comprising the at least one reporting configuration and the at least one resource configuration; and
to receive, from the UE, at least one CSI report based on the transmitted message.

24. The apparatus of clause 23, in which:
the at least one reporting configuration configures reporting for a plurality of CSI reports, each CSI report of the plurality of CSI reports corresponding to a CSI-IM resource pattern of the plurality of CSI-IM resource patterns;
each CSI report comprises an interference measurement based on a total interference power of a set of resource elements (REs) of the resource blocks aligned with a time and frequency location of a CSI-IM resource pattern corresponding to the CSI report;
the set of REs comprise at least one of a cell-specific reference signal (CRS) RE, a first physical downlink shared channel (PDSCH) RE in a symbol including CRS REs, or a second PDSCH RE in a symbol without CRS REs; and
the processor causes the apparatus to receive, from the UE, a signal strength measurement of the neighbor cell.

25. The apparatus of clause 23 or 24, in which CSI resources are semi-persistent resources or periodic resources.

26. The apparatus of any of the clauses 23 or 24, in which:
the at least one reporting configuration indicates a periodic reporting periodicity; and
the processor causes the apparatus:
to receive the at least one CSI report by receiving each CSI report of the plurality of CSI reports according to the periodic reporting periodicity;
to select one or more CSI reports from the plurality of CSI reports based on the signal strength measurement of the neighbor cell; and
to schedule the UE based on the interference measurement of the one or more CSI reports.

27. The apparatus of any of the clauses 23 or 24, in which:
the at least one reporting configuration indicates a semi-persistent reporting periodicity; and
the processor causes the apparatus:
to receive the at least one CSI report by receiving each CSI report of a set of CSI reports from the plurality of CSI reports according to the semi-persistent reporting periodicity; and
to transmit a signal for activating the set of CSI reports and a set of CSI-IM resource patterns corresponding to the set of CSI reports based on the signal strength measurement of the neighbor cell.

28. The apparatus of any of the clauses 23, 24, or 27, in which CSI resources are periodic resources, semi-persistent resources or aperiodic resources.

29. The apparatus of any of the clauses 23 or 24, in which:
the at least one reporting configuration indicates an aperiodic reporting periodicity; and
the processor causes the apparatus:
to receive the at least one CSI report by receiving each CSI report of a set of CSI reports from the plurality of CSI reports in response to a trigger; and
to transmit the trigger for triggering the set of CSI reports and a set of CSI-IM resource patterns corresponding to the set of CSI reports based on the signal strength measurement of the neighbor cell.

30. The apparatus of any of the clauses 23-29, in which a first frequency shift parameter (vShift) of cell-specific reference signal (CRS) resource elements (REs) of a serving cell of the second RAT is different from a second vShift of CRS REs of the neighbor cell.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication performed by a user equipment (UE), comprising:
   receiving, from a base station, a message comprising at least one reporting configuration and at least one resource configuration for a plurality of channel state information-interference measurement (CSI-IM) resource patterns associated with a first radio access technology (RAT), each CSI-IM resource pattern of the plurality of CSI-IM resource patterns corresponding to a time and frequency location in a resource block of a neighbor cell associated with a second RAT; and
   transmitting at least one CSI report based on the at least one reporting configuration and the at least one resource configuration.

2. The method of claim 1, in which:
   the at least one reporting configuration configures reporting for a plurality of CSI reports, each CSI report of the plurality of CSI reports corresponding to a CSI-IM resource pattern of the plurality of CSI-IM resource patterns;
   an interference measurement of each CSI report comprises a total interference power of a set of resource elements (REs) of the resource blocks aligned with a time and frequency location of the CSI-IM resource pattern corresponding to the CSI report; and
   the set of REs comprises at least one of a cell-specific reference signal (CRS) RE, a first physical downlink shared channel (PDSCH) RE in a symbol including CRS REs, or a second PDSCH RE in a symbol without CRS REs.

3. The method of claim 2, in which:
   the at least one reporting configuration indicates a periodic reporting periodicity;
   the transmitting the at least one CSI report comprises transmitting each CSI report of the plurality of CSI reports according to the periodic reporting periodicity; and
   the method further comprises measuring the interference measurement for each CSI-IM resource pattern of the plurality of CSI-IM resource patterns.

4. The method of claim 2, in which:
   the at least one reporting configuration indicates a semi-persistent reporting periodicity;
   the transmitting the at least one CSI report comprises transmitting each CSI report of a set of CSI reports from the plurality of CSI reports according to the semi-persistent reporting periodicity; and
   the method further comprises:
      receiving a signal for activating the set of CSI reports and a set of CSI-IM resource patterns corresponding to the set of CSI reports; and
      measuring the interference power for each CSI-IM resource pattern of the set of CSI-IM resource patterns.

5. The method of claim 4, in which CSI resources are semi-persistent resources or periodic resources.

6. The method of claim 2, in which:
   the at least one reporting configuration indicates an aperiodic reporting periodicity;
   transmitting the at least one CSI report comprises transmitting each CSI report of a set of CSI reports from the plurality of CSI reports in response to a trigger; and
   the method further comprises:
      receiving the trigger for triggering the set of CSI reports and a set of CSI-IM resource patterns corresponding to the set of CSI reports; and
      measuring the interference power for each CSI-IM resource pattern of the set of CSI-IM resource patterns.

7. The method of claim 6, in which CSI resources are periodic resources, semi-persistent resources or aperiodic resources.

8. The method of claim 1, in which a first frequency shift parameter (vShift) of cell-specific reference signal (CRS) resource elements (REs) of a serving cell of the second RAT is different from a second vShift of CRS REs of the neighbor cell.

9. A method for wireless communication performed by a base station associated with a first radio access technology (RAT), comprising:
   configuring at least one reporting configuration and at least one resource configuration for a plurality of channel state information-interference measurement (CSI-IM) resource patterns associated with the first RAT, each CSI-IM resource pattern of the plurality of CSI-IM resource patterns corresponding to a time and frequency location in a resource block of a neighbor cell associated with a second RAT;
   transmitting, to a user equipment (UE), a message comprising the at least one reporting configuration and the at least one resource configuration; and
   receiving, from the UE, at least one CSI report based on the transmitted message.

10. The method of claim 9, in which:
    the at least one reporting configuration configures reporting for a plurality of CSI reports, each CSI report of the plurality of CSI reports corresponding to a CSI-IM resource pattern of the plurality of CSI-IM resource patterns;

each CSI report comprises an interference measurement based on a total interference power of a set of resource elements (REs) of the resource blocks aligned with a time and frequency location of a CSI-IM resource pattern corresponding to the CSI report;
the set of REs comprises at least one of a cell-specific reference signal (CRS) RE, a first physical downlink shared channel (PDSCH) RE in a symbol including CRS REs, or a second PDSCH RE in a symbol without CRS REs; and
the method further comprises receiving, from the UE, a signal strength measurement of the neighbor cell.

11. The method of claim 10, in which:
the at least one reporting configuration indicates a periodic reporting periodicity;
the receiving the at least one CSI report comprises receiving each CSI report of the plurality of CSI reports according to the periodic reporting periodicity; and
the method further comprises:
selecting one or more CSI reports from the plurality of CSI reports based on the signal strength measurement of the neighbor cell; and
scheduling the UE based on the interference measurement of the one or more CSI reports.

12. The method of claim 10, in which:
the at least one reporting configuration indicates a semi-persistent reporting periodicity;
the receiving the at least one CSI report comprises receiving each CSI report of a set of CSI reports from the plurality of CSI reports according to the semi-persistent reporting periodicity; and
the method further comprises transmitting a signal for activating the set of CSI reports and a set of CSI-IM resource patterns corresponding to the set of CSI reports based on the signal strength measurement of the neighbor cell.

13. The method of claim 12, in which CSI resources are semi-persistent resources or periodic resources.

14. The method of claim 10, in which:
the at least one reporting configuration indicates an aperiodic reporting periodicity;
the receiving the at least one CSI report comprises receiving each CSI report of a set of CSI reports from the plurality of CSI reports in response to a trigger; and
the method further comprises transmitting the trigger to trigger the set of CSI reports and a set of CSI-IM resource patterns corresponding to the set of CSI reports based on the signal strength measurement of the neighbor cell.

15. The method of claim 14, in which CSI resources are periodic resources, semi-persistent resources or aperiodic resources.

16. The method of claim 9, in which a first frequency shift parameter (vShift) of cell-specific reference signal (CRS) resource elements (REs) of a serving cell of the second RAT is different from a second vShift of CRS REs of the neighbor cell.

17. An apparatus for wireless communications at a user equipment (UE), comprising:
a processor,
memory coupled with the processor; and
instructions stored in the memory and operable, when executed by the processor, to cause the apparatus:
to receive, from a base station, a message comprising at least one reporting configuration and at least one resource configuration for a plurality of channel state information-interference measurement (CSI-IM) resource patterns associated with a first radio access technology (RAT), each CSI-IM resource pattern of the plurality of CSI-IM resource patterns corresponding to a time and frequency location in a resource block of a neighbor cell associated with a second RAT; and
to transmit at least one CSI report based on the at least one reporting configuration and the at least one resource configuration.

18. The apparatus of claim 17, in which:
the at least one reporting configuration configures reporting for a plurality of CSI reports, each CSI report of the plurality of CSI reports corresponding to a CSI-IM resource pattern of the plurality of CSI-IM resource patterns;
an interference measurement of each CSI report comprises a total interference power of a set of resource elements (REs) of the resource blocks aligned with a time and frequency location of a CSI-IM resource pattern corresponding to the CSI report; and
the set of REs comprises at least one of a cell-specific reference signal (CRS) RE, a first physical downlink shared channel (PDSCH) RE in a symbol including CRS REs, or a second PDSCH RE in a symbol without CRS REs.

19. The apparatus of claim 18, in which:
the at least one reporting configuration indicates a periodic reporting periodicity; and
the processor causes the apparatus:
to transmit the at least one CSI report by transmitting each CSI report of the plurality of CSI reports according to the periodic reporting periodicity; and
to measure the interference measurement for each CSI-IM resource pattern of the plurality of CSI-IM resource patterns.

20. The apparatus of claim 18, in which:
the at least one reporting configuration indicates a semi-persistent reporting periodicity; and
the processor causes the apparatus:
to transmit the at least one CSI report by transmitting each CSI report of a set of CSI reports from the plurality of CSI reports according to the semi-persistent reporting periodicity;
to receive a signal for activating the set of CSI reports and a set of CSI-IM resource patterns corresponding to the set of CSI reports; and
to measure the interference power for each CSI-IM resource pattern of the set of CSI-IM resource patterns.

21. The apparatus of claim 18, in which:
the at least one reporting configuration indicates an aperiodic reporting periodicity; and
the processor causes the apparatus:
to transmit the at least one CSI report by transmitting each CSI report of a set of CSI reports from the plurality of CSI reports in response to a trigger; and
to receive the trigger for triggering the set of CSI reports and a set of CSI-IM resource patterns corresponding to the set of CSI reports; and
to measure the interference power for each CSI-IM resource pattern of the set of CSI-IM resource patterns.

22. The apparatus of claim 17, in which a first frequency shift parameter (vShift) of cell-specific reference signal (CRS) resource elements (REs) of a serving cell of the second RAT is different from a second vShift of CRS REs of the neighbor cell.

23. An apparatus for wireless communications at a base station associated with a first radio access technology (RAT), comprising:
- a processor,
- memory coupled with the processor; and
- instructions stored in the memory and operable, when executed by the processor, to cause the apparatus:
  - to configure at least one reporting configuration and at least one resource configuration for a plurality of channel state information-interference measurement (CSI-IM) resource patterns associated with the first RAT, each CSI-IM resource pattern of the plurality of CSI-IM resource patterns corresponding to a time and frequency location in a resource block of a neighbor cell associated with a second RAT;
  - to transmit, to a user equipment (UE), a message comprising the at least one reporting configuration and the at least one resource configuration; and
  - to receive, from the UE, at least one CSI report based on the transmitted message.

24. The apparatus of claim 23, in which:
the at least one reporting configuration configures reporting for a plurality of CSI reports, each CSI report of the plurality of CSI reports corresponding to a CSI-IM resource pattern of the plurality of CSI-IM resource patterns;
each CSI report comprises an interference measurement based on a total interference power of a set of resource elements (REs) of the resource blocks aligned with a time and frequency location of a CSI-IM resource pattern corresponding to the CSI report;
the set of REs comprise at least one of a cell-specific reference signal (CRS) RE, a first physical downlink shared channel (PDSCH) RE in a symbol including CRS REs, or a second PDSCH RE in a symbol without CRS REs; and
the processor causes the apparatus to receive, from the UE, a signal strength measurement of the neighbor cell.

25. The apparatus of claim 24, in which CSI resources are semi-persistent resources or periodic resources.

26. The apparatus of claim 24, in which:
the at least one reporting configuration indicates a periodic reporting periodicity; and
the processor causes the apparatus:
- to receive the at least one CSI report by receiving each CSI report of the plurality of CSI reports according to the periodic reporting periodicity;
- to select one or more CSI reports from the plurality of CSI reports based on the signal strength measurement of the neighbor cell; and
- to schedule the UE based on the interference measurement of the one or more CSI reports.

27. The apparatus of claim 24, in which:
the at least one reporting configuration indicates a semi-persistent reporting periodicity; and
the processor causes the apparatus:
- to receive the at least one CSI report by receiving each CSI report of a set of CSI reports from the plurality of CSI reports according to the semi-persistent reporting periodicity; and
- to transmit a signal for activating the set of CSI reports and a set of CSI-IM resource patterns corresponding to the set of CSI reports based on the signal strength measurement of the neighbor cell.

28. The apparatus of claim 26, in which CSI resources are periodic resources, semi-persistent resources or aperiodic resources.

29. The apparatus of claim 24, in which:
the at least one reporting configuration indicates an aperiodic reporting periodicity; and
the processor causes the apparatus:
- to receive the at least one CSI report by receiving each CSI report of a set of CSI reports from the plurality of CSI reports in response to a trigger; and
- to transmit the trigger for triggering the set of CSI reports and a set of CSI-IM resource patterns corresponding to the set of CSI reports based on the signal strength measurement of the neighbor cell.

30. The apparatus of claim 23, in which a first frequency shift parameter (vShift) of cell-specific reference signal (CRS) resource elements (REs) of a serving cell of the second RAT is different from a second vShift of CRS REs of the neighbor cell.

* * * * *